United States Patent Office 3,144,402
Patented Aug. 11, 1964

3,144,402
REACTIVATION OF A PLATINUM GROUP CATALYST COMPOSITE EMPLOYED IN THE REFORMING OF A NAPHTHA
Eugene F. Schwarzenbek, Short Hills, and John Turkevich, Princeton, N.J., assignors to Pullman Incorporated, a corporation of Delaware
No Drawing. Continuation of application Ser. No. 317,368, Oct. 28, 1952. This application Dec. 16, 1963, Ser. No. 330,660
7 Claims. (Cl. 208—140)

This is a continuation of application Serial No. 317,368, filed October 28, 1952, now abandoned, which in turn is a continuation-in-part of application Serial No. 294,707, filed June 20, 1952.

This invention relates to a method for reactivating a platinum and/or palladium catalyst which has become non-responsive to known or conventional means of regeneration, and also relates to a method of regeneration of platinum and/or palladium catalysts whereby catalytic properties are substantially restored.

It is known that platinum and palladium catalysts may become temporarily deactivated by the deposition of carbonaceous material thereon, and the activity can be restored by treating the catalyst with a diluted air stream at an elevated temperature in order to remove the carbonaceous deposit. In some instances, the platinum or palladium catalyst may become deactivated to the extent that the treatment with a diluted air stream at an elevated temperature does not restore the activity thereof for a specific reaction or process. In other cases, it was observed that some platinum and palladium catalysts can be used for prolonged periods of time, including many regenerations with a diluted air stream and at an elevated temperature before the activity of the catalyst for a specific reaction or process declines permanently. In any event, the permanent deactivation of the catalyst necessitates its replacement with fresh catalyst. Platinum and palladium catalysts are expensive to manufacture, and therefore, it is of considerable importance to provide a method whereby the permanently deactivated catalyst can be reactivated for further use. Furthermore, it is of importance to provide a regeneration treatment whereby such permanent deactivation can be substantially avoided. By means of the present invention, it is proposed to provide a method whereby platinum and palladium catalysts can be reactivated for a specific reaction or process after they have become permanently deactivated, and/or furnish a method of regeneration which is sufficiently effective in removing carbonaceous deposits and prevents permanent deactivation of the catalyst.

It is an object of this invention to provide a method for reactivating platinum and palladium catalysts for a specific reaction or process.

Another object of this invention is to provide a method for reactivating platinum and/or palladium catalysts which are non-reactive to known or conventional methods of regeneration.

Still another object of this invention is to reactivate platinum and palladium catalysts which contain a difficultly removable carbonaceous deposit.

A further object of this invention is to provide an effective method for the removal of carbonaceous deposits on platinum and/or palladium catalysts during regeneration treatments so as to prevent permanent deactivation of the catalyst.

Other objects and advantages of this invention will become apparent from the following explanation and description thereof.

In accordance with the present invention, it is proposed treating platinum and/or palladium catalysts with an oxygen containing gas under such conditions that the oxygen partial pressure is at least about 3 p.s.i.a., more usually, about 5 to about 200 p.s.i.a., preferably about 14.7 to about 100 p.s.i.a. The catalyst is treated at a temperature of about 700° to about 1600° F., more usually, about 700° to about 1250° F. At low oxygen partial pressure, e.g., about 3 to about 15 p.s.i.a., it is preferred to employ higher temperatures in the range specified, i.e., in the range of about 1050° to about 1600° F. As a result of experimental work, it was noted that what heretofore was considered a permanently deactivated catalyst contained crystalline carbon or graphite, and since this carbon material is almost impossible to remove by conventional regeneration techniques, i.e., involving mild conditions, a severe treatment was believed to be necessary. Pure oxygen was employed in a reactivation treatment at an elevated temperature, and the catalyst treated was substantially restored in catalytic properties. It was noted that the graphite content was reduced, but not entirely eliminated. The phenomenon for restoring catalytic activity is not really understood, although it appears that more severe conditions for treatment than conventionally used are necessary, and conditions in the direction of burning off crystalline or graphite carbon will restore substantially catalytic properties.

Severe conditions of treatment which can restore catalytic properties substantially, whether the catalyst is permanently deactivated or not, are selected on the basis of time, temperature and oxygen concentration. When the temperature and oxygen concentration are low, a long period of treatment, significantly longer than conventional practice, is employed. A high temperature may not require as long a period of treatment, nor may a high oxygen concentration be required. The criterion to follow is to use a period of treatment which will restore substantially catalytic properties for a particular reaction or process. Another basis for determining the period of treatment is the crystalline or graphite carbon content. In such a case, the period of treatment to use would be sufficient to remove substantially the graphite carbon. This method is not applicable for all cases, however, when the catalyst has been deactivated through continual deposition of carbonaceous material and removal thereof, in a hydrocarbon conversion process, e.g., reforming, graphite carbon may form thereon which can serve as a basis for determining the severity of treatment. For example, in one instance when employing an oxygen partial pressure of 1 atmosphere, to remove a graphite deposit of about 0.2% by weight based on the total platinum catalyst, it may require about 0.5 hours at 1200° F., about 400 hours at 700° F. and 100 hours at 800° F. At an oxygen partial pressure of about 50 p.s.i.a., for the above case, the length of treatment may be approximately one-third the periods indicated above for an operation involving an oxygen partial pressure of 1 atmosphere. The criterion to follow in such a case in determining the length of treatment is to use a period which effects complete or substantially complete removal of crystalline carbon or graphite from the catalyst. However, generally, without regard as to whether the catalyst contains crystalline carbon or not, the period of treatment may vary from about 10 minutes to about 500 hours. In the case of reactivating a catalyst which has not been previously regenerated in accordance with the technique of this invention, the period of treatment usually varies from about 0.5 to about 400 hours.

At present considerable investigation is being conducted on platinum and/or palladium catalysts to find a method of regeneration or reactivation which substantially revivifies the catalyst after carbonaceous material has been deposited thereon. In all cases where mild conditions were used, the regeneration was successful for a limited period of time, and then, suddenly, catalytic property was lost for a given reaction or process despite regeneration treatment. This phenomenon is particularly acute in reforming naphthas with platinum and/or palladium catalysts under such conditions that small amounts of carbonaceous material are deposited before regeneration. The carbonaceous material contains non-crystalline or amorphous material in predominant quantity, and this kind of material is known to be easily burned with an oxygen containing gas under mild conditions. Generally, it is desirable, although not necessary, to remove the amorphous material by employing an oxygen containing gas stream containing about 0.5 to 10% by volume of oxygen or an oxygen partial pressure of about .07 to about 1.5 p.s.i.a., for the initial stages of regeneration, and then the oxygen concentration can be increased to about 20–21% by volume or an equivalent increase in oxygen partial pressure when it appears that undue temperature rises will not occur. The temperature of regeneration to remove amorphous carbon is from about 600° to about 1250° F., preferably 800° to 1000° F.

By X-ray analysis, it was shown that a sample of deactivated platinum catalyst contained crystalline carbon or graphite. As a result the following theory is advanced as a possible explanation of what occurs. It appears that platinum and/or palladium catalysts have the tendency to convert amorphous carbon to graphite. Once crystalline carbon is formed, its presence appears to catalyze the further formation of graphite by serving as nuclei for the growth of graphite crystals. During a normal period of operation when the performance of catalyst is within expectations, there may be a small number of graphite crystals on the surface of the catalyst, but the number is not sufficiently great to cause the transformation of amorphous carbon to graphite at such a rate and extent to effect serious impairment of catalytic property. With time, the quantity of graphite crystals become sufficiently great, so that if not removed, the transformation of amorphous carbon to graphite during the reaction cycle is enough to seriously deactivate the catalyst. This event is akin to the usual phenomenon of crystallization, wherein rapid and profuse crystallization is obtained after having sufficient nuclei for crystallization present from "seeding," etc. This appears to explain the sudden loss of catalytic activity and the coincident presence of crystalline carbon on the catalyst. The above theory has been advanced for explaining the phenomenon of this invention, however, it should be understood that we do not intend to be bound thereby.

It is to be noted that by employing the relatively mild regeneration treatment practiced heretofore, inevitably the catalyst will lose its catalytic properties, sooner or later. This occurrence can now be substantially prevented by practicing the present invention under such conditions that severe treatment is effected. Hence, the present invention is applicable as a preventive as well as a cure for platinum and/or palladium catalysts. In the case of regeneration, the conditions of treatment may be less severe than is generally used in a reactivation treatment upon a catalyst which is permanently deactivated, or the regeneration treatment can be more severe than reactivation conditions, however, generally, the conditions fall within the range specified for oxygen partial pressure, temperature and time given hereinabove. In view that the regeneration treatment will constitute part of a cyclic system, it is preferred to employ a set of conditions which are sufficiently severe and yet fit into the general scheme of operation. Accordingly, it is preferred to regenerate at a temperature of about 700° to about 1250° F., and still better, about 950° to about 1150° F., with an oxygen partial pressure of about 14.7 to about 100 p.s.i.a., and for a period of about 15 minutes to about 2 hours. When a small amount of carbonaceous material is present in the catalyst, the severe regeneration treatment may be effected without any preliminary steps for the removal of amorphous carbon. On the other hand, relatively higher carbonaceous concentrations on catalyst may be more advantageously processed by first burning the same with a relatively dilute oxygen stream containing about 1 to about 5% by volume of oxygen at a temperature of about 850° to about 1050° F. and for a period of about 1 minute to about 15 minutes at atmospheric pressure, or an equivalent oxygen partial pressure at superatmospheric conditions, namely, about 0.15 to about 0.75 p.s.i.a., and then employing the more rigorous regeneration conditions described above.

The regeneration or reactivation treatment can be used for a platinum and/or palladium catalyst system involving a fixed fluid or fixed non-fluid operation or a fluid operation involving the circulation of catalyst from a separate reaction zone to the reactivation and/or regeneration zone. It is contemplated operating the regeneration treatment with an excess of oxygen in the flue gas of at least about 6% by volume, based on the total flue gas, in order to insure a high oxygen partial pressure in the regeneration zone. As a result of regeneration or reactivation treatment in accordance with the present invention, there may or may not be sorbed and/or chemically combined oxygen associated with the platinum and/or palladium metals. The catalyst may be treated with a hydrogen containing gas, e.g., hydrogen, recycle gas containing hydrogen for a reforming or hydroforming process, etc., at a temperature of about 400° to about 1200° F., preferably about 700° to 1000° F. The quantity of hydrogen containing gas may be a very small amount or relatively high, relative to the quantity of catalyst. The quantity of hydrogen containing gas employed will affect the period of time necessary to remove the oxygen which is associated with the catalytic metal. Hence, the concentration of hydrogen and the period of treatment will vary considerably depending upon the results desired. In the case of reforming hydrocarbons in the presence of hydrogen, there may be no point in separately treating the catalyst with hydrogen, because the treatment in the reforming zone may be enough.

Platinum and/or palladium catalysts generally contain about 0.05 to about 20% by weight of carbonaceous material, prior to being regenerated or reactivated by means of the present invention. Ordinarily, a permanently deactivated catalyst, that is, one which has lost catalytic property permanently, as heretofore understood, acquires an unusual amount of carbonaceous material due to the drop in properties. Usually, deactivated catalysts contain about 2 to about 15% by weight of carbonaceous material of which at least about 1% by weight more or less may be crystalline or graphite carbon. The quantity of carbonaceous material may vary lower or higher than the range specified. A temporarily deactivated catalyst usually contains about 0.1 to about 2% by weight of carbonaceous material, and the quantity of crystalline carbon present may not be detectable.

It should be understood that by "permanent deactivation" in the present invention, it is meant that a platinum or palladium catalyst has lost at least about 40 to 100% of the original activity it possessed for a specific reaction or process, and such loss of activity is not restorable by known means of revivification. Platinum and palladium catalysts can be reemployed for a variety of reactions, such as for example, dehydrogenation, hydrogenation, hydrogenolysis, cracking, hydrocracking (i.e., cracking under hydrogen pressure) isomerization, oxidation, aromatization, cyclization, hydrodesulfurization, hydrocarbon synthesis, dealkylation, hydrodechlorination, dehydroxylation, alkylation, polymerization, hydrogen exchange systems, etc. Those catalysts which are permanently deactivated in a hydrocarbon conversion system are particularly applicable or susceptible to reactivation or regeneration under the present invention. In this respect, for example, platinum and palladium catalysts which are used for reforming operations and which show permanent excessive cracking tendencies can be satisfactorily reactivated to a level of activity and selectivity which compares favorably to a freshly prepared catalyst.

The method of the present invention is applicable for treating platinum and palladium catalysts which are derived by various methods of preparation. Generally, the catalysts are prepared by using a compound of platinum and palladium as a means for dispersing or distributing the active metallic component throughout a carrier material. Thereafter, the mixture of materials are dried, followed by a calcination or reduction treatment whereby the platinum or palladium compound is decomposed or converted to an active or catalytic state. The platinum or palladium compound which is employed as a precursor material in the preparation of the catalyst can be, for example, an ammine complex of palladium or platinum, the potassium salt of chloroplatinic or chloropalladic acid or the acids themselves, platinic or palladic sulfide, etc. As previously indicated, these platinum and palladium compounds are mixed with a suitable carrier material and then dried with a subsequent calcination or reduction treatment. Generally, the drying of the catalyst mass is accomplished by subjecting same to a temperature of about 150° to about 400° F. and for a period of about 2 to about 50 hours. The calcination treatment when employed involves using a temperature of about 600° to about 1500° F. for a period of about 2 to about 12 hours.

The platinum or palladium catalyst may be one which has been prepared with an ammine complex of platinum and/or palladium. The platinum or palladium ammine complex is prepared from ammonia or substituted ammonia compounds, e.g., the amines, etc., and a platinum or palladium compound. The methods for preparing the ammine complexes involve complexing a platinum or palladium compound, such as a salt, e.g., a halide, nitrates, sulfates, sulfites, nitrites, oxyhalides, etc., with ammonia or substituted ammonia, e.g., alkylamine, alkyldiamine, quinolines, pyridines, hydrazo compounds, hydroxylamines, etc. The platinum or palladium in the complex may have a coordination valence of 4 to 6. The ammine complexes may be soluble in a polar or non-polar solvent, which is used for facilitating the catalyst preparation, or such ammines can be colloidally dispersed in either a polar or non-polar solvent in the required quantities. In either case, the solution or suspension of ammine complex should be employed in quantities which will provide uniform distribution of the complex throughout the entire catalyst mixture in the desired manner. However, it is preferred to employ the water soluble ammine complexes by reason that these compounds result in very effective types of catalysts. After the ammine complex of platinum and/or palladium is mixed with the desired carrier material, it is subjected to a drying step and then followed by a calcination or reduction treatment. The conditions for the drying and calcination procedures are given hereinabove.

The catalysts can also be prepared by the method comprising the decomposition of a compound of a metal selected from the class consisting of platinum and palladium to form a metallic residue on a carrier material in the presence of a metal such as mercury, zinc or cadmium or compounds thereof. The activating agent can be used in the form of an organic or inorganic compound of mercury, zinc or cadmium or mixtures of the foregoing compounds. The inorganic compounds of mercury, zinc or cadmium include the oxides; hydroxides; salts, e.g., chlorides, chlorates, bromides, nitrates, sulfates, nitrites, sulfites, carbonates, bicarbonates, oxychlorides, fluorides, iodides, phosphates, phosphites, etc. Specific examples of inorganic compounds are mercuric acetate, zinc acetate, cadmium carbonate, etc. The quantity of activating agent employed is about 0.01 to about 10%, preferably about 0.5 to about 5%, based on the weight of the carrier. The activating agent may be added to the catalyst mass at any point prior to the calcination or reduction treatment.

The conditions of drying and calcination are the same as those described above.

A promoting agent may also be used in the preparation of the catalyst. This agent is selected from the class consisting of an alcohol and a ketone which are soluble in water to the extent of at least about 0.5% by weight at 70° C. A variety of classes of compounds are included for this purpose, such as for example, primary, secondary and tertiary aliphatic mono-hydric alcohols, aliphatic dihydric alcohols, aliphatic trihydric alcohols, ketones of the aliphatic and aromatic type, aliphatic and aromatic alcohols, etc. Among the aliphatic alcohols, it is preferred to employ the alkanols containing about 1 to about 9 carbon atoms in the molecule. Of the aliphatic polyhydric alcohols, it is preferred to employ those containing not more than 10 carbon atoms in the molecule. The alkanols containing not more than 4 carbon atoms in the molecule are preferred. The amount of promoting agent employed is determined on the basis of the water which is present in the catalyst mass, prior to subjecting same to the drying and/or calcination treatment. It is desirable, ordinarily, to use about 1 to about 50% by weight, preferably about 10 to about 40% by weight of the promoting agent, based on the weight of water which is pressent in the catalyst mass, prior to subjecting the mass to a drying or calcination treatment. Specific examples of promoting agents which are useful include methanol, ethanol, propanol, butanol, acetone, glycol, benzyl alcohols, etc. The drying and calcination treatments are conducted in the manner described hereinabove.

For additional information as to the techniques of preparation and the various materials which may be employed in the preparation of the platinum and palladium catalysts before being treated in accordance with the method of this invention, reference is to be had to copending applications, S.N. 226,099, filed May 12, 1951, now abandoned, S.N. 242,031, filed August 15, 1951, now Patent No. 2,662,861, and S.N. 248,470, filed September 26, 1951, now Patent No. 2,760,940.

The carrier material employed in the preparation of the platinum and palladium catalysts include a large number and variety of materials. For example, the carrier material can be silica, alumina, titania, charcoal, thoria, zirconia, pumice, kieselguhr, fuller's earth, magnesia, silica-alumina, silica-magnesia, etc. Furthermore, the catalysts may be of the type which contain halogen, such as for example, combined fluorine, chlorine, etc. The halogen content can be from about .01 to about 10%, by weight, based on the total catalyst.

In the finished catalyst, the platinum or palladium can constitute about 0.01 to about 5%, or more often, it is found that the catalytic agent is about 0.5 to about 2%, based on the total weight of the catalyst. The catalyst may contain larger amounts of platinum or palladium, such as for example, up to about 15% by weight. However, it is to be noted that the cost of such metals does not warrant using such large amounts thereof.

In order to more fully understand the present invention, reference will be had to specific examples thereof, however, it should be understood that no undue limitations or restrictions are to be imposed by reason thereof.

In all of the following experiments, the original catalyst was obtained by the following procedure.

5210 grams of aluminum chloride, $AlCl_3 \cdot 6H_2O$, were dissolved in 14 liters of water and then mixed with 3.8 liters of concentrated ammonium hydroxide to obtain precipitated alumina gel. 300 ml. of concentrated ammonium hydroxide and 3 liters of water were further added in order to adjust the pH of the alumina gel to 7.10 at 32° C. and also to obtain a stirrable mass. The mass was filtered and the filter cakes were washed to remove chlorine compounds and reslurrying the same with a solution of 13 liters of water and 130 ml. of concentrated ammonium hydroxide for one hour and then filtering again. After nine more similar washings, a slight trace of chlorine was found in the filtrate. The washed alumina gel was peptized with 32 cc. of glacial acetic acid (.1 ml. of acetic acid per mol of aluminum) which lowered the pH to 4.35 at 20° C.

Platinum ammine complex was prepared by dissolving 4.2 grams of platinum chloride in 375 cc. of concentrated ammonium hydroxide. To this solution was added about 5 ml. of glacial acetic acid to obtain a pH of substantially 7. The complex thus prepared was poured into the above alumina and the mixture stirred for one hour. The pH of the mixture was 5.57 at 23° C. The slurry was dried at a temperature of 230° F. on a porcelain dish in a small oven. The dried mass weighed 807 grams. The dried catalyst mass was ground to pass through a 40 mesh screen and in this condition, it was calcined for two hours at 1000° F. The resultant catalyst mass weighed 563 grams, and appeared grayish with small black specks throughout. It was then pelleted into pills of 3/16 inch size, and the pills were calcined for an additional 4 hours at 1000° F. The final catalyst has a platinum content of 0.47% by weight.

Platinum and palladium are effective as catalysts for reforming or hydroforming light hydrocarbon oils, e.g., naphtha or kerosene stocks. In the reforming operation, the conditions may be varied widely to include temperatures of about 600 to about 1050° F., preferably about 800 to about 950° F.; weight space velocities of about 0.5 to about 10.0 lbs. of naphtha per hour per pound of catalyst in the reaction zone, preferably about 0.25 to about 5.0 lbs. of naphtha per hour per pound of catalyst; a hydrogen rate of about 0.5 to about 20 mols of hydrogen per mol of hydrocarbon reactants and a pressure of about 50 to about 1000 p.s.i.g., preferably about 100 to about 750 p.s.i.g. If a moving bed system is employed, the catalyst to oil ratio, on a weight basis, is generally about 0.01 to about 10. The process is conducted as a fixed bed involving lumps, pellets or granules of catalyst, or a fixed fluid bed employing particles having about 0 to about 250 microns size, more usually, about 10 to 100 microns. The system can be a moving bed type employing any type of catalyst, notably fluid.

The catalyst described above was evaluated by employing same to reform a Mid-Continent of heavy naphtha having an initial boiling point of 228° F. and an end point of 435° F. This naphtha had an octane number (CFRM) of 30 and contained approximately 9% aromatics by volume. The catalyst was tested on a laboratory scale using a fixed bed technique in a reactor of 550 cc. capacity. Hydrogen was fed in a pure state at the rates given in the tables hereinbelow, designated as s.c.f.b., meaning standard cubic feet of hydrogen per barrel of oil feed, measured at 60° F. and 760 mm. of mercury. Regeneration of the catalyst was conducted by purging the catalyst with hydrogen after the same had become partially deactivated by the accumulation of carbonaceous deposits. The pressure of the system was released and then purged with nitrogen. The catalyst was then heated to 950° F. and a mixture of air and nitrogen containing 2-8% by volume of oxygen was passed over the catalyst at the rate of 20 cubic feet per hour and for a period of about half an hour. The oxygen concentration was increased gradually from 2 to 8% during the regeneration run, at each time it was noticed that the temperature was falling from 1000° F. This treatment is considered to be a mild regeneration, and corresponds essentially to the procedure employed conventionally. During this operation, the temperature at various points in the bed was ascertained with two thermocouples, one located in the upper part and the other in the lower part of the bed. The flow of air through the bed was continued for about ½ hour after the temperature dropped back to 950° F. After another nitrogen purge, the mixture was again placed under hydrogen pressure while the temperature was adjusted before charging naphtha feed.

The data obtained in Table I below demonstrates by comparison the extent of permanent deactivation undergone by the catalyst prepared in accordance with the procedure disclosed herein.

Table I

| Run No. | 1 | 2 | 3 | 4 |
|---|---|---|---|---|
| No. Regenerations | 35 | 40 | 41 | 42 |
| Process Conditions: | | | | |
| Temperature, °F | 901 | 900 | 901 | 901 |
| Pressure, p.s.i.g | 500 | 500 | 500 | 500 |
| Space Vel., W$_o$/hr./W$_c$ | 1.01 | 1.12 | 1.0 | 1.0 |
| Hydrogen Rate, s.c.f.b | 4,610 | 4,440 | 5,000 | 5,000 |
| Length of Run, Hrs | 8 | 8 | 8 | 8 |
| Yields:[1] | | | | |
| Aromatics in C$_4$ Free-Gasoline, Wt. Percent | 45.4 | 31.4 | 29.0 | |
| 100% C$_4$ Gasoline, Vol. Percent | 85.9 | 82.4 | | |
| Excess Butanes, Vol. Percent | -1.1 | 21.8 | | |
| 10# RVP Gasoline, Vol. Percent | 87.0 | 60.6 | | |
| Octane No. Clear: | | | | |
| 10# RVP Gasoline CFRM | 80.5 | 65.4 | | |
| 10# RVP Gasoline CFRR | 89.1 | 70.6 | 71 | 70 |

[1] Gasoline of 400° F. (E.P.).

From Table I, it is noted that the platinum catalyst was a satisfactory reforming catalyst as shown in Run No. 1. After further use, the catalyst began to show excessive cracking tendencies which is evident from the increase in yield of excess butanes, the decrease in yield of gasoline and the lowering of the octane number of the gasoline product. The decrease in yield of gasoline illustrates that the catalyst has lost selectivity in reforming; whereas the decrease in the octane number of the gasoline product indicates that the catalyst has lost activity for reforming naphtha. As is evident from Runs 2-4, inclusive, further regeneration by conventional means or mild treatment had no apparent beneficial effect upon catalytic property.

In order to determine possible means of reactivating the so-called permanently deactivated catalyst shown in Table I, various schemes were employed. As one possible method of reactivation, the catalyst used for Run 4 of Table I was subjected to a hydrogen regeneration treatment by subjecting the catalyst to a temperature of 900° F. and passing hydrogen therethrough at the rate of 15 cubic feet per hour at 500 p.s.i.g. and for 24 hours. After this hydrogen regeneration treatment, the catalyst was again evaluated under reforming conditions and the results of these experiments are given in Table II below.

Table II

Process conditions:
Temperature, °F _____ 900
Pressure, p.s.i.g _____ 500
Space vel., w$_o$/hr./w$_c$ _____ 1.0
Hydrogen rate, s.c.f.b _____ 5000
Length of run, hrs _____ 8

Octane No. clear:
10# RVP gasoline, CFRM _____ 65
10# RVP gasoline, CFRR _____ 70

It is evident from Table II that the hydrogen regeneration treatment did not effect any beneficial results with respect to reactivating the catalyst for reforming.

As another scheme for effecting the reactivation of the catalyst which was employed for the test given in Table II, the catalyst was first ground and then diluted with a freshly calcined alumina, which was prepared in the manner described hereinabove for the platinum catalyst. The mixture of calcined-alumina and the catalyst employed for the run given in Table II was then pelleted to provide a catalyst consisting of 60% added alumina and 40% of the deactivated catalyst. As a result of the dilution, the final composition of the catalyst was 0.2% platinum and 99.8% alumina. In this state, the catalyst was tested under reforming conditions and the results are given in Table III below.

Table III

| Run No. | 1 | 2 |
|---|---|---|
| No. of Regenerations | 0 | 1 |
| Process Conditions: | | |
| Temperature, °F | 905 | 902 |
| Pressure, p.s.i.g. | 500 | 500 |
| Space Vel., W₀/hr./W_c | 1.00 | 1.05 |
| Hydrogen Rate, s.c.f.b. | 4,480 | 4,725 |
| Length of run, hrs | 8 | 8 |
| Yields: | | |
| Aromatics in C₄ Free-Gasoline, Wt. Percent | 29.0 | 26.9 |
| 100% C₄ Gasoline, Vol. Percent | 91.4 | 89.2 |
| Excess Butanes, Vol. Percent | 5.3 | 7.7 |
| 10# RVP Gasoline, Vol. Percent | 86.1 | 81.5 |
| Octane No. Clear: | | |
| 10# RVP Gasoline, CFRM | 70.0 | 67.9 |
| 10# RVP Gasoline, CFRR | 74.0 | 72.4 |

From Table III above, it is to be noted that the dilution of the deactivated catalyst with alumina did effect a beneficial result with respect to the yield of gasoline, however, it is to be noted that the activity of the catalyst was still substantially low compared to the deactivated catalyst, prior to dilution with alumina. The increase in yield of gasoline can be attributed to the fresh alumina which has been added to the deactivated catalyst. However, it is to be noted that the catalyst after being used and regenerated under mild conditions began to fall off significantly in selectivity, and the activity also dropped off appreciably, although it was originally low.

The catalyst employed in the experiments in Table III was treated in accordance with the process of the present invention. The reactivation was conducted in a quartz tube having a length of 42 inches and an inside diameter of 1⅛ inches, which was surrounded by a laboratory electric furnace. The catalyst was charged into the quartz tube and it occupied 19 inches of the length thereof. A stream of oxygen was first passed through a solution of sulfuric acid and then a dryer containing calcium chloride, before flowing upwardly through the catalyst mass in the quartz tube at atmospheric pressure essentially. During the daytime, for a period of about 8 hours, the temperature of the catalyst mass was maintained at 900° F. and during the night, for a period of about 16 hours, the temperature was held at 700° F. At these temperatures and using a continuous flow of oxygen through the catalyst mass, the experiments were carried out for a total period of 84 hours. After the oxygen treatment, the catalyst was charged to the 550 cc. test unit, pretreated with hydrogen at a temperature of 900° F. and for a period of 1 hour and tested under reforming conditions. Results are given in Table IV below.

Table IV

| Run No. | 1 | 2 |
|---|---|---|
| No. of Regenerations | 0 | 1 |
| Process Conditions: | | |
| Temperature, °F | 900 | 900 |
| Pressure, p.s.i.g. | 500 | 500 |
| Space Vel., W₀/hr./W_c | 0.49 | 0.98 |
| Hydrogen Rate, s.c.f.b. | 5,819 | 5,345 |
| Length of run, hrs | 8 | 8 |
| Yields: | | |
| Aromatics in C₄ Free-Gasoline, Wt. percent | 37.1 | 46.2 |
| 100% C₄ Gasoline, Vol. percent | 87.1 | 88.8 |
| Excess Butanes, Vol. Percent | 8.6 | 4.9 |
| 10# RVP Gasoline, Vol. Percent | 78.5 | 83.9 |
| Octane No.: | | |
| 10# RVP Gasoline, CFRM | 85.0 | 81.5 |
| 10# RVP Gasoline, CFRR | 94.9 | 90.3 |

From the above table, it is to be noted that as a result of the treatment with oxygen, the catalyst was restored to its original activity and substantially to its original selectivity. This is quite evident from the octane numbers of the gasoline product, the yield of gasoline and the low yield of excess butanes. Another significant change which clearly demonstrates the restoration of catalytic activity is the increase in aromatic production over the catalyst used in Table III. Furthermore, Run No. 2 demonstrates that once the catalyst has become reactivated, temporary loss of activity from carbon deposition in the reforming run does not adversely influence the reactivation in a significant manner. This data clearly shows the unusual effectiveness of our invention for reactivating a supposedly permanently deactivated platinum catalyst. However, since it is possible to revivify a catalyst, which heretofore for all practical purposes had to be discarded, it readily follows that the severe conditions of treatment with oxygen can be used as a regeneration technique whereby the permanent deactivation is prevented from happening in the first place.

Having thus described our invention by reference to specific illustrations, it should be understood that no undue limitations or restrictions are to be imposed and that the scope of the invention is defined by the following claims.

We claim:

1. The method of restoring activity of a platinum alumina hydroforming catalyst which has become partially deactivated and contaminated with carbon, which method comprises removing readily combustible carbon from and treating the partially deactivated catalyst under oxidizing conditions, said treating being with an oxygen-containing gas having an oxygen partial pressure of at least about 5 p.s.i.a., at a temperature about 900° F. for a period of at least 10 minutes and which is sufficient to restore substantially the hydroforming properties of the catalyst as freshly prepared.

2. The method of restoring activity of a platinum alumina hydroforming catalyst which has become partially deactivated and contaminated with carbon, which method comprises removing readily combustible carbon from and treating the partially deactivated catalyst under oxidizing conditions, said treating being with an oxygen-containing gas having an oxygen partial pressure of at least about 5 p.s.i.a., at a temperature between about 800° F. and about 900° F. for a period of at least 10 minutes and which is sufficient to restore substantially the hydroforming properties of the catalyst as freshly prepared.

3. The method of restoring activity of a platinum alumina hydroforming catalyst which has become partially deactivated and contaminated with carbon, which method comprises removing readily combustible carbon from and treating the partially deactivated catalyst under oxidizing conditions, said treating being with an oxygen-containing gas having an oxygen partial pressure of at least about 5 p.s.i.a., at a temperature of 900° F. for a period of at least 10 minutes and which is sufficient to restore substantially the hydroforming properties of the catalyst as freshly prepared.

4. In a reforming process which comprises contacting a naphtha with a fluidized mass of finely divided catalyst comprising a catalytic element selected from the group consisting of platinum and palladium supported on a carrier selected from a group consisting of silica, alumina, titania, thoria, zirconia, pumice, kieselguhr, fuller's earth, magnesia, silica-alumina and silica-magnesia at a temperature of about 800 to 950° F., a weight space velocity of about 0.25 to about 5, in the presence of added hydrogen in the amount of 0.5 to about 20 mols of hydrogen per mol of naphtha, at a total pressure of about 100 to 700 p.s.i.g., and at a catalyst to oil ratio of 0.1 to about 10 mols, such that a reformed liquid product is obtained and a carbonaceous material is deposited on the catalyst thereby decreasing the catalytic properties of the catalyst; the method for improving the catalytic properties of the used catalyst which includes the step of treating the used catalyst with an oxygen-containing gas having an oxygen pressure of about 5 to about 200 p.s.i.a., at a temperature of about 800 to about 900° F. for a period sufficient to restore a substantial portion of the catalytic properties of the used catalyst.

5. A reforming process which comprises contacting a naphtha with a catalyst comprising a catalytic element selected from the group consisting of platinum and palladium supported on a carrier selected from a group consisting of silica, alumina, titania, thoria, zirconia, pumice, kieselguhr, fuller's earth, magnesia, silica-alumina and silica-magnesia under suitable reforming conditions such that a reformed product is obtained and the catalyst is contaminated with a carbonaceous material, contacting the contaminated catalyst with an oxygen-containing gas having a relatively low partial pressure for a sufficient period of time to remove at least a portion of said carbonaceous material from said catalyst by oxidation thereof, and thereafter contacting the catalyst with an oxygen-containing gas having a relatively high oxygen pressure between about 5 and about 200 p.s.i.a., at a temperature of 900° F. for a period of time sufficient to restore a substantial portion of the catalytic properties of said catalyst.

6. The method of restoring activity of a platinum alumina hydroforming catalyst which has become partially deactivated and contaminated with carbon, which method comprises removing readily combustible carbon from and treating the partially deactivated catalyst under oxidizing conditions, said treating being with an oxygen-containing gas having an oxygen partial pressure of at least about 5 p.s.i.a., at a temperature above 800° F. and below 950° F. for a period of at least 10 minutes and which is sufficient to restore substantially the hydroforming properties of the catalyst as freshly prepared.

7. A reforming process which comprises contacting a naphtha with a catalyst comprising a catalytic element selected from the group consisting of platinum and palladium supported on a carrier selected from the group consisting of silica, alumina, titania, thoria, zirconia, pumice, kieselguhr, fuller's earth, magnesia, silica-alumina and silica-magnesia under suitable reforming conditions such that a reformed product is obtained and the catalyst is contaminated with a carbonaceous material, contacting the contaminated catalyst with an oxygen-containing gas having a relatively low partial pressure for a sufficient period of time to remove at least a portion of said carbonaceous material from said catalyst by oxidation thereof, and thereafter contacting the catalyst with an oxygen-containing gas having a relatively high oxygen partial pressure above about 5 p.s.i.a. and at a temperature above 800° F. and below 950° F. for a period of time sufficient to restore a substantial portion of the catalytic properties of said catalyst.

References Cited in the file of this patent
UNITED STATES PATENTS
3,011,968    Webb _____ Dec. 5, 1961